United States Patent Office 3,093,604
Patented June 11, 1963

3,093,604
COMPOSITION COMPRISING LIGNOCELLULOSIC EXTENDER AND OXIDIZED EXTRACTED LIGNIN AND ADHESIVE SOLUTION CONTAINING SAME
Joseph W. Ayers, Easton, Pa., assignor to Agrashell, Inc., Los Angeles, Calif., a corporation of Delaware
No Drawing. Filed June 30, 1960, Ser. No. 39,812
24 Claims. (Cl. 260—17.2)

This invention relates to compositions of matter containing ligno-cellulosic extender and oxidized, extracted lignin for adding to and improving the performance qualities of phenol-formaldehyde and other thermosetting aldehydic adhesive solutions and glues used in plywood and other laminate production, and it relates also to the adhesive solutions containing such compositions of matter.

Uniform particle size walnut shell flour has been used as an extender for synthetic resin glues for several years and the resulting adhesive compositions have been uniquely successful in the production of superior exterior grade plywood. Whereas these glues have been quite satisfactory for the production of high quality bonds on average core and veneer stocks, the plywood industry is now faced with a rapidly decreasing quality of veneer stock. When attempts have been made to use these glues on low quality of "fringe" veneer stocks, satisfactory performance was not obtained due to (1) lack of penetration and bond to hard knots, sap lines and endgrain veneers, (2) excessive penetration of the soft, porous summer growth wood, and (3) poor transfer from spreader rolls to dry core veneers because of low degree of tack and low glue viscosity.

It is an object of the present invention to provide extender compositions which when added to synthetic resin glues of the character used in the plywood industry, will provide adhesive compositions specially adjusted for such purposes having properties overcoming the foregoing deficiencies such that improved commercially acceptable plywood and laminates for exterior as well as interior use can be obtained from lower quality stocks as well as high grade stocks.

Another object is to provide synthetic resin adhesives for plywood manufacture which contain larger proportions of inexpensive extender materials and water, without sacrifice in performance, whereby glue costs can be substantially reduced.

Another object is to provide thermosetting aldehydic adhesive solutions which will be effective in producing high grade plywood of any thickness, as 3/16 to 13/16 inch or more, in which lower grade cores are employed.

The invention may be considered to reside, firstly, in new compositions of matter composed wholly or primarily of a combination of finely divided, ligno-cellulosic extenders together with finely divided, oxidized, extracted lignin obtainable from any one of a number of possible sources. These extender compositions are particularly designed for sale to and use by fabricators of plywood and laminates of similar requirements, but they can be employed in adhesive compositions used in veneering, in other laminating operations and in assembly work.

Secondly, invention of an equal or even greater order extends to the adhesive compositions produced by the incorporation of these extender compositions in thermosetting aldehydic resin glue solutions particularly those of the phenolic type used in the plywood industry for the production of exterior grade plywood, for such adhesive compositions have outstanding unique working properties and lead to plywood and similar laminates having superior bonds.

The preferred lignin component from which the oxidized lignin of the compositions of the invention is obtained is referred to as an "alkali lignin," for it is produced as a by-product from wood pulping processes employing alkali, the most common procedure being known as the kraft process. The by-product liquid extracted from the pulped mass is purified and concentrated by various companies to provide a series of lignin products including separated or freed lignin, and sodium lignate. These products are usually reduced to a powder and sold in this condition.

In the practice of the present invention it is preferred that oxidized lignin products in substantially purified form be employed, for not only are superior ultimate results obtainable but greater uniformity of working properties of the adhesives follow. The most satisfactory material for incorporation with the extenders is the oxidized, substantially purified lignin itself or lignin from which the cellulose and soluble products have been substantially removed to provide a consistently uniform product.

Since synthetic resin glues or adhesive compositions as now produced are alkaline in character and such condition is ordinarily to be retained in the adhesive compositions of the present invention, the utilization of the extender compositions containing oxidized, substantially purified or free lignin in such glue compositions leads to redissolution of the lignin and the formation of alkali or sodium lignate. Very little alkali is required to dissolve the free oxidized lignin and hence caustic alkali need be added to the glue composition only if required for the other purposes hereinafter described. Some free alkali generally gives better results. If oxidized sodium lignate is used instead of oxidized free lignin, then of course none of the alkali present in the glue or added to the mix, is taken up by the lignin.

The lignin components of the oxidized lignins of applicant's compositions are both acid-insoluble and water-insoluble and are referred to as being "extracted," for they are products which have been separated from the wood or other ligno-cellulose material. Sulfonic acid derivatives, or lignin sulfonates, such as are obtained in the sulfite process of paper production being acid- and water-soluble are not included within the scope of said term. Only through the use of lignin in extracted form can the quality and the performance of the adhesive compositions of the invention be attained and maintained. To produce commercially acceptable results, experience has shown that it is essential that not only must the ligno-cellulose extender be of known constitution and uniform character, but also the oxidized lignin component must be of a definite and known quality.

Any of the three general types of lignin being manufactured and offered for commercial use may be oxidized for employment in the practice of the present invention, these commercial lignins being definable as follows: "Indulin A" is a purified pine wood lignin, precipitated with acid to the extent that all of the sodium lignate in the black liquor is converted to lignin, and after this precipitation is completed, all residual sodium salts and soluble impurities are washed from the product before it is dried and processed into a fine particle size powder. "Indulin B" is a purified salt of lignin, said to contain approximately 4% of sodium which is a sufficient amount to make the product soluble in water. "Indulin C" is a crude sodium salt of lignin, containing about 9.8% of sodium, the said product containing all the lignin present in the black liquor as sodium lignate and in addition the impurities of the black liquor. This last mentioned product can be dried, as by spray drying or by some other dewatering means, to provide a dry powder. These products are described in the booklet entitled "Indulin" issued by the West Virginia Pulp and Paper Co., Charleston, West Virginia (1951). Other suitable lignin products contemplated are disclosed in the booklet entitled "Commercial Lignins" by Robert S. Aries and Arthur Pollak issued by the Northeastern Wood Council, New Haven, Connecticut (1949).

Less satisfactorily, the extracted lignin of the oxidized lignin component may be a product derived from lignocellulosic materials by biological action (as the butt rot of trees) or by selective solvent action using ether, alcohol and other solvents, examples of such product being described in the literature. All of these extracted lignins are soluble in alkali at ambient temperatures or at the normal room temperatures at which they are used in the formulation of the adhesives of the present invention.

Oxidized lignin is obtainable from the extracted lignins defined above by known means, not constituting part of the present invention. Such oxidation may be effected in neutral solution, in alkaline medium, or under certain circumstances, in acid media. Such action can also be accomplished electrolytically or by enzymatic action. Practically considered, the oxidation is accomplished under aqueous alkaline conditions simply by introducing oxygen into the aqueous alkaline suspension of the extracted lignin.

The oxidized extracted lignins are those extracted lignins hereinbefore described which have been oxidized to a point where they impart an increased viscosity of practical effect to aqueous glue solutions in which they are incorporated. The oxidation effected imparts stability to glue solutions to which the oxidized lignin has been added, by preventing loss of glue at the glue lines due to excessive penetration into the pores of the surfaces of the plies during curing. This retention of viscosity during heating to the setting temperature and the prevention of excessive flow into the pores constitutes the primary advantage of the presence of the extracted lignin in the oxidized condition. Oxidation to an extent providing any appreciable degree of viscosity increase in the aqueous suspension improves the retention at the glue line.

As is indicated in the hereinbefore mentioned Indulin booklet (page 18), the oxidation may be effected satisfactorily by introducing oxygen into an alkaline solution in water or other solvent until about 1 to 7 mols of oxygen per mol of lignin (M.W. 840) has taken up. The alkalinity may be imparted by the addition of any alkali, suitably sodium hydroxide, in a quantity of from 1–16 mols per mol of extracted lignin. As is also pointed out in said booklet, the rate and extent of oxygen absorption is increased with increasing alkali content. If oxidation is continued too long, the gel is advanced in structure too far, and drying and further processing becomes very difficult or practically impossible. Thus it is the practical problem of handling which limits the permissible amount of oxidation. In all instances, the oxidation is terminated, of course, before any drastic break down of the lignin molecules occurs and destroys their viscosity-imparting qualities.

An oxidizing lignin found particularly effective was produced by concentrating a spent black cooking liquor obtained from a kraft paper process to provide a liquid containing 18 to 20% solids. Cooled carbon dioxide gas was then bubbled through the concentrated solution while said solution was being continuously circulated, to precipitate the lignin. Upon completion of the precipitation, the carbonated liquor was heated at a temperature close to boiling to coagulate the lignin. After being cooled, the coagulated lignin was separated by filtration and the lignin was purified by washing.

The washed cake was then repulped in water and sufficient sodium hydroxide was added to adjust the pH of the suspension to an approximate value of 9. Thereupon air was blown into the solution during vigorous agitation until oxidation had occurred, this result being determined by the viscosity increase of the suspension. After oxidation, the suspension was concentrated, filtered and dried, this latter result preferably being obtained by spray drying. The final product thus obtained can be described as a technically pure, oxidized, extracted alkali lignin.

The completion of the oxidation step in the above-described process was determined by a standardized test involving adding 60 grams of the oxidized product and 300 grams of distilled water to a 600 cc. beaker. The mixture in the beaker was then stirred for three minutes with an electric stirrer. Next a sodium hydroxide solution made up of 50 grams water and 2 grams of solid sodium hydroxide was added. The resulting mixture was then electrically stirred for a period of five minutes. Thereupon, the mass was adjusted to a temperature of 77° F. and allowed to stand at this temperature for fifteen minutes. At the end of this period, the viscosity was measured with a Brookfield viscosimeter equipped with a No. 4 spindle, at 6 r.p.m. The reading was 90,000 centipoises.

Using this test for the determination and control of the oxidation, oxidized extracted lignins operable for the purposes of the present invention have revealed viscosities as low as 5000 centipoises and viscosities much higher than the 90,000 centipoises reading.

In addition to the above defined oxidized, extracted alkali lignin, the invention contemplates the use of oxidized, extracted alkali lignins containing some thiolignin due to the presence of SH groups introduced into the lignin molecules by the action of sodium sulfide during cooking processes used in preparing paper by the sulfide process.

The ligno-cellulosic extenders preferred in the products of the invention are vegetable shell materials including nut shells, endocarps of drupes and grain hulls. Among these extenders there may be mentioned by way of example the shells of nuts such as walnut (both English and black), hickory, palm and filbert; the pit shells of fruits such as peach, plum and apricot, the hulls of grains and seeds such as oat hulls and the cones or strobiles of coniferous trees. Wood flour can be used to advantage in special adhesive compositions of limited utility.

Another type of finely divided extender may be any one of a number of the degradation products derived by the hydrolysis of oat hulls, corn cobs, cotton seed hulls and other like lignocellulosic materials having a high percentage of extractable pentosans. The preferred degradation products are the furfural by-product residues left from the commercial extraction by acid hydrolysis of pentosans from various agricultural waste products such as pentosan-containing materials from plants of the family Graminales. These degradation residues are described in the Ash and Lambuth Patent No. 2,727,869.

A third type of extender may be described as the non-fibrous component of bark phloem such as may be obtained from pine, hemlock, fir, cedar and other like trees. These bark products and their utilization in phenolic aldehyde adhesives are described in the Heritage Patents Nos. 2,574,784 and 2,574,785.

Lignocellulosic materials superficially treated with alkali, but substantially unaltered such as those described in the Ayers Patent No. 2,507,465 can with varying degrees of success be employed in the practice of the present invention and hence are not excluded by the terms used herein for defining the extender component.

The extender-oxidized lignin compositions of the present invention are used most effectively in combination with phenolic-aldehyde resin glues which are employed extensively in the production of exterior grade plywood. Most commonly, such products constitute alkaline colloidal solutions or aqueous emulsions having from about 40 to 50% resin solids. The resins most generally used in glue compositions and preferred in the present compositions are those resulting from the reaction of alkali catalyzed solutions of phenol and formaldehyde having a pH from about 9.5 to 13. It is also contemplated that phenolic-aldehyde resins as are obtained by the reaction of cresol or other substituted phenols with formaldehyde and other aldehydes such as acetaldehyde and paraformaldehyde can be used.

A suitable phenolic resin may be produced for example, by reacting 1 mol of phenol with 2 mols of formaldehyde in the presence of sodium hydroxide in an amount of about 3% based on the weight of the phenol, the reaction being carried out at 85 to 100° C. until the proper viscosity is obtained, after which the resulting reaction solution is diluted with an aqueous solution to yield a product of about 50% solids, this product being compatible with water and convertible into a hard insoluble product when heated to a temperature above 100° C.

Highly satisfactory and improved results are also obtained when the extender-oxidized lignin compositions of the invention are employed with amino-aldehydic glues, and in particular urea-formaldehyde glues, which glues, to a large extent, are employed in the production of plywood of interior grade. The adhesive compositions of the present invention containing the urea-formaldehyde glue have the most surprising capacity for producing plywood meeting the standard qualifications of high grade products.

A urea-formaldehyde resin suitable for use as a plywood adhesive may be produced by heating together 60 parts of urea, 160 parts of formalin (37%), 2 parts of ammonium hydroxide (28%) and 1 part of sodium acetate at 90° C. for two hours. If the pH at the end of the reaction is lower than 7.0, more ammonium hydroxide is added. A vacuum of 22–28 inches of mercury is applied to distill off the water, at 60° C., to obtain a viscosity (Gardner tubes) of W–Z. The mass is then cooled to 30° C., and ammonium hydroxide is added to adjust the solution to a pH of 7.5.

Other thermosetting aldehydric resin glues with which the compositions of the invention may be employed include melamine-formaldehyde glues and resorcinol-aldehyde glues.

In producing the glue adhesives of the present invention the amount of oxidized lignin employed in relation to the amount of the lignocellulosic extender is dependent on the chemical composition and physical properties of the lignocellulosic material used, but the optimum amount required to produce the most satisfactory properties in the adhesive composition does not vary much from 15–20% oxidized lignin. For most purposes amounts within this range produce highly satisfactory results but substantial advantages can be obtained by using from 5 to 50% oxidized lignin in the oxidized lignin-extender compositions.

In producing the adhesive compositions of the present invention utilizing the oxidized lignin-containing extender compositions, conventional ratios of resin to extender composition to water can be employed. With conventional phenolic resin glue aqueous emulsions (about 40–50% solids), the weight ratio of resin to extender to water, for highest quality, is 5/1/1.75. In the practice of the present invention it has been discovered that, through the addition of the oxidized lignin, larger proportions of extender and water can be employed with the various glues in the adhesive compositions with quite satisfactory results. Ratios of 5/1–4/1.75–7 are all economically acceptable. The quality of the bond will depend, not only on the adhesive compositions, but also on other factors such as assembly time, press temperature, pressure and curing time.

When the proportion of oxidized lignin added to the extender composition is relatively low, the alkali in the glue solution used may be sufficient, and no addition of free alkali, caustic alkali or sodium carbonate may be required. The quality or structure of the wood to be bonded with the adhesive composition containing this amount of lignin determines the necessity for, the nature of, and the amount to be added. However, when the proportion of lignin is sufficiently high to affect adversely the viscosity of the adhesive composition, caustic alkali and/or sodium carbonate may be required in an amount of 5% or more (in relation to the extender-oxidized lignin content) to reduce the viscosity to a satisfactory level, from 15 to 20% appearing to be the maximum permissible amount of the hydroxide or the carbonate, whether used alone or in combination. The nature of the wood to be bonded may affect the amount of lignin as well as the amount of alkali to be used, if optimum strength is desired.

These highly loaded adhesive compositions are satisfactory for the production of good quality exterior plywoods and they are as well eminently suitable for the production of high quality interior building plywoods.

The lignin-extender compositions of the present invention may be prepared simply by mixing finely divided dry ligno-cellulose extender with dry powdered oxidized lignin or oxidized sodium lignate. For producing the adhesives from this composition, the preferred procedure involves adding to the dry composition an aqueous alkaline solution, either hot or cold, in an amount which provides the amount of water required and the amount of alkali required to produce the desired alkalinity in the glue composition. The mixing can be accomplished at normal room temperatures with available tap water (10–40° F.) although water at higher temperatures (80–200° F.) may be used if available, and after a homogeneous mass is obtained, the synthetic resin glue is added and stirred until a homogeneous mass is again obtained.

In accordance with a modification of the invention, the extender compositions and adhesive solutions are produced by the addition of a mixture of oxidized lignin with plain or unoxidized extracted lignin, all or part of which may be in the form of sodium lignate, as "Indulin C." The unoxidized extracted lignin will ordinarily replace part of the oxidized extracted lignin in the compositions herein defined. The amount of the oxidized lignin which can be replaced by unoxidized lignin depends upon a number of factors including the grade or porosity of the wood and viscosity requirements of the glue solution. Displacement in greatest amounts is possible when plywood products of thin construction, as 3/16 inch, are being produced. From 5 to 75% of the oxidized lignin may be replaced by the unoxidized lignin (and/or the sodium lignate), and when thin plywood is fabricated, the displacement may reach as high as 90%.

In a special and important embodiment of the invention whereby uniquely high grade plywood bonds are obtained, the phenolic-aldehydic adhesive compositions used with the novel extender-oxidized lignin compositions herein described are supplemented by the addition of a polyepoxide resin containing free epoxy groups.

The epoxy resin is most easily and effectively introduced into the composition with the lignocellulose extender-oxidized lignin compositions herein described. The extender in comminuted form is preferably first coated with the epoxy resin and then the resulting mass is mixed with the oxidized extracted lignin in the manner hereinbefore described.

The coating may be carried out in any desired way or simply by introducing ground cellulosic materials, as walnut shell flour, into a ball mill with the desired percentage (ordinarily 2–7% by weight) of liquid epoxy resin as sold commercially, premixing until the resin is taken up by the lignocellulosic material, next adding the balls and turning for an additional period, as for fifteen minutes. The epoxy resin spreads throughout the mass and uniformly coats the particles of the lignocellulosic material.

The amount of epoxy resin mixed with or coated upon the lignocellulosic material depends upon many factors and amounts up to thirty percent of the extender can be employed but for most purposes, from about 1% to 5%, is sufficient.

The epoxy resin employed in this embodiment of the invention is exemplified by the monomeric glycidyl polyethers of polyhydric phenols, such as 2,2-bis (4-glycidyl oxyphenol) propane and their polymers. The epoxy resin component may be any of the available ethoxylin or polyepoxide resin products now sold on the market for use in producing hard resin products. The resin contemplated may have any molecular weight and epoxy equivalent so long as free epoxy groups are available for reaction with the cellulose extender or reaction with a phenolformaldehyde resin if present and possibly also with other components of glue compositions herein described.

Epoxy resins have been described in published material as being produced by reacting polyhydroxy hydrocarbons including phenols of the nature of resorcinol, glycerin, bisphenols such as bis-phenol A and diphenylolpropane with epichlorohydrin or with dichlorohydrin in the presence of an inorganic or organic base in aqueous or alkaline solution preferably during heating. As a result of the reaction there is formed a thermosetting resin which may thereafter be subsequently polymerized by the action of heat, an acid, alkaline or amine catalyst.

Other examples of epoxy resins contemplated are those resulting from the reaction of alcohols, including glycerol, pentaerythritol, trimethylol propane, sorbitol, glycol and the like with a chlorohydrin, i.e., epichlorohydrin or dichlorohydrin. There may be mentioned also those resulting from polyallyl alcohol-epichlorhydrin, paraphenyl (phenol) epichlorohydrin; dimethylol phenols (such as dimethylol para-cresol, or dimethylol tertiary butyl or amyl phenols) epichlorhydrin, and glycerol-epichlorohydrin diglycidyl ether. Finally, dimethylol phenols formed by alkaline condensation with formaldehyde provide operable resins with epichlorohydrin (glycol monochlorhydrin).

The epoxy compounds of one type and preferred in the present invention may be referred to as aromatic diglycidyl ethers resulting from the reaction of epichlorohydrin and 2,2-bis (parahydroxyphenol) propane, in aqueous alkaline media such as sodium hydroxide. Condensation products of such compounds are also contemplated as for example, the glycerol diaryldiglycidyl ether.

The diglycidyl ether may be prepared for example by reacting 1 mol of 2,2-bis (parahydroxyphenol) propane with 4 mols of epichlorohydrin by heating the mixture in an atmosphere of nitrogen at a temperature of from 105 to 110° C. for a period of 16 hours during which 2 mols of sodium hydroxide in 30% aqueous solution are added dropwise. The excess of epichlorohydrin is continuously removed with the water of reaction as an azeotropic mixture. The compound is washed with water to remove the sodium chloride formed as a by-product of the reaction. The resulting diglycidyl ether has a molecular weight of about 350, an epoxide equivalent of 200 and a viscosity (Gardner tubes) of $Z_5$–$Z_6$.

The condensation products may be prepared in accordance with the above procedure but the mol ratio of epichlorohydrin to the bis compound is lower than 4 to 1 and of the order of 3 to 1. These ethers contain a glycerol hydroxy group and are higher molecular weight condensation products having for example, a molecular weight of about 450 and an epoxide equivalent of from about 225 to 290 and a melting point of about 20 to 28° F. Other epoxy resins utilizable are disclosed in the book entitled "Epoxy Resins" by Henry Lee and Kris Neville published by the McGraw-Hill Book Company, Inc., New York, in 1957.

In a less desirable variation of the foregoing embodiment, the epoxy resin may be added directly to the phenolicaldehyde resin aqueous alkaline solution (a true solution or a colloidal solution), ether before or after the addition of the lignocellulose-oxidized lignin extender, and the water or other ingredients to be included in the adhesive composition. The epoxy resin disperses readily in this aqueous medium.

The proportions of the two resins used in the adhesive compositions in this phase of the invention may be varied within wide limits but one of the advantages of this embodiment is that phenolic resin glues and the plywood produced therefrom may be greatly improved by the addition of only a minor amount or a very small percentage of the epoxy resin. Improved results can be obtained when as little as .4 of 1% epoxy resin, by weight, is used in relation to the amounts of phenolic resin solid employed. For very high quality plywood at economically feasible cost, the epoxy resin may amount to as much as 12%.

*Example 1*

An extender composition is prepared by mixing 85 parts of walnut shell flour with 15 parts of an oxidized lignin powder obtained from purified pinewood alkali lignin until a homogeneous mass is obtained, the parts being by weight. This extender composition is then added to an aqueous mass composed of 20 parts sodium hydroxide, 25 parts of sodium carbonate and 175 parts of water and stirring is continued until a uniform mass is obtained. Thereupon 500 parts of a phenolformaldehyde resin glue solution (viscosity G; solids content 40.8%) is added and stirring continued until a homogeneous mass is again obtained.

*Example 2*

The procedure of Example 1 is repeated except 5 parts of the oxidized lignin is replaced with 5 parts of the purified pinewood lignin powder which had not been theretofore oxidized.

*Example 3*

The procedure of claim 1 is repeated except that the oxidized lignin product called for therein is replaced by an equal amount of a purified sodium lignate powder in oxidized form.

*Example 4*

An extender composition like that of Example 1 is produced using (1) 120 parts of walnut shell flour the particles of which have been coated with a reactive epoxy resin in a proportion of 3%, and (2) 30 parts of oxidized lignin powder. This extender is incorporated in an aqueous solution containing 300 parts water, 20 parts sodium hydroxide and 25 parts sodium carbonate. Thereupon 300 parts of a phenolformaldehyde resin glue solution (viscosity J; solids content 40.0%) is added and stirring continued until a homogeneous mass is obtained.

| Example | 5 | 6 | 7 | 8 | 9 | 10 | 11 |
|---|---|---|---|---|---|---|---|
| Extender Composition: | | | | | | | |
| Walnut Shell Flour | 115 | 110 | 110 | 106 | 100 | 90 | 75 |
| Oxidized Lignin [1] | 10 | 15 | 7.5 | 19 | 15 | 25 | 40 |
| Indulin B | | | 7.5 | | | | |
| NaOH (50% sol.) | 20 | 20 | 20 | 20 | 30 | 30 | 30 |
| Soda Ash | | | | 15 | 15 | 15 | 15 |
| C.M.C.[2] | 0.75 | 1 | 1 | | | | |
| Water | 175 | 175 | 175 | 175 | 175 | 175 | 175 |
| Resin [3] | 500 | 500 | 500 | 500 | | | |
| Resin [4] | | | | | 500 | 500 | 500 |
| Shear Test: [5] | | | | | | | |
| 5/16 P.C | 138 | 189 | 193 | 169 | 197 | 194 | 139 |
| 9/16 P.C | 115 | 152 | 183 | 158 | 164 | 134 | 132 |
| 13/16 P.C | 145 | 84 | 95 | 214 | 109 | 145 | 94 |
| W.F. Test: [6] | | | | | | | |
| 5/16 P.C | 93 | 97 | 97 | 97 | 99 | 97 | 99 |
| 9/16 P.C | 94 | 95 | 97 | 96 | 96 | 96 | 96 |
| 13/16 P.C | 98 | 96 | 94 | 93 | 87 | 93 | 81 |

[1] In Exs. 5–8 oxidized lignin (from kraft process on pine wood). In Exs. 9–11 oxidized lignin (from kraft process on pine wood); subsequently purchased sample.
[2] Carboxymethylcellulose.
[3] Borden Co. No. W-156 (phenol-formaldehyde aqueous resin emulsion) solids content 40–42%.
[4] Reichhold Chemical Co. No. P-398 H.V. (phenol-formaldehyde aqueous resin emulsion) solids content 40–42%.
[5] Figures are average strength of 2, 10 and 20 min. assembly times of plywood construction.
[6] Figures are average percent wood failure of 2, 10 and 20 min. assembly time, plywood construction.

Indulin B can be replaced with Indulin C with similar results, in Example 7.

Example 12

Twenty parts of oxidized extracted lignin are thoroughly mixed with 80 parts, by weight, of a commercial degradation product obtained by the acid hydrolysis of oat hulls containing 38% cellulose and 42% lignin in finely divided form, 99% of which is −100 mesh and 90° of which is −325 mesh.

One hundred parts of the foregoing extended solution are mixed with 20 parts of sodium hydroxide (50% solution), with 10 parts of sodium carbonate, 165 parts of water and 500 parts of phenolformaldehyde glue solution of 40-42% solids.

Example 13

The procedure of Example 12 was altered by substituting for the degradation product described therein an equal weight of a non-fibrous, bark phloem having 29% cellulose and 59% lignin by weight, the particle size distribution being as follows:

|  | Percent |
|---|---|
| On 100 mesh | 6 |
| 100–200 mesh | 45 |
| 200–325 mesh | 24 |
| And through 325 mesh | 25 |

Example 14

An extender composition was obtained by mixing together 20 parts of oxidized extracted lignin with 80 parts by weight of walnut shell flour which had theretofore been coated with 5% of epoxy resin. This composition in the proportion of 100 parts was mixed with 20 parts of sodium hydroxide (50% solution), with 10 parts sodium carbonate, with 165 parts of water and with 500 parts of a phenol-formaldehyde glue solution containing 40-42% solids.

The outstanding advantages of the extended compositions and of the adhesive compositions of the invention containing the oxidized lignin may be outlined as follows:

A. The tendency of the adhesive solutions to penetrate excessively into the open pore structure of the plywood and particularly the core layer is effectively reduced.

B. The adhesive solutions possess an increased viscosity which does not increase excessively during application thereof by the rolls of glue machines.

C. The adhesive solutions possess better tack and transfer properties and this means that the glue solution is more easily spreadable from the spreading rolls of the glue machine to the wood surfaces.

D. The presence of the oxidized lignin in the adhesive solution imparts excellent dispersent properties for the ligno-cellulosic component, such as shell flour, used in the glue composition.

E. Plywood products of excellent properties as to shear strength as well as to water and weather resistance are obtainable in all constructions, whether thick or thin plywood, and whether high grade or low grade cores are employed.

This application is a continuation-in-part of my co-pending application Serial No. 643,501 filed March 4, 1957, now abandoned.

It should be understood that the invention is not limited to the specific details herein given, but that it extends to all equivalents which will occur to those skilled in the art upon consideration of the scope of the claims appended hereto.

I claim:

1. A composition of matter for adding to and improving the qualities of a colloidal liquid adhesive composition, consisting essentially of a homogeneous dry powdery mixture of a major proportion of a finely divided, ligno-cellulosic extender proponderantly of particle sizes below about 100 mesh and a minor proportion, sufficient to enhance the viscosity of said adhesive composition, of a finely divided, extracted lignin in oxidized condition and containing about 1 to 7 mols of added oxygen per mol of lignin.

2. A composition of matter for adding to and improving the working and bonding qualities of a liquid synthetic resin adhesive composition for plywood and laminate production, consisting essentially of a homogeneous dry powdery mixture of a finely divided, non-fibrous ligno-cellulosic extender preponderantly of particle sizes below about 100 mesh and a minor amount of a finely divided, substantially purified, extracted lignin in oxidized condition and containing about 1 to 7 mols of added oxygen per mol of lignin, obtained by the oxidation of extracted lignin derived from alkali lignin.

3. A composition of matter for adding to and improving the working, bonding and other qualities of a liquid synthetic resin adhesive composition for plywood and laminate production, consisting essentially of a homogeneous dry powdery mixture of a finely divided, non-fibrous ligno-cellulosic extender preponderantly of particle sizes below about 100 mesh and a minor amount of a finely divided, substantially purified, extracted lignin in oxidized condition and containing about 1 to 7 mols of added oxygen per mol of lignin, said extracted lignin being derived from a kraft paper pulp process.

4. A composition of matter for adding to and improving the working and bonding qualities of a liquid synthetic resin adhesive composition for plywood and laminate production, consisting essentially of a homogeneous dry powdery mixture of a vegetable shell flour extender preponderantly of particle sizes below about 100 mesh and a minor amount of a finely divided, extracted lignin in oxidized condition and containing about 1 to 7 mols of added oxygen per mol of lignin, said extracted lignin being derived from pine wood alkali lignin.

5. Plywood-, and laminating-adhesive solutions which comprise a thermosetting aldehydic resin glue selected from the group consisting of phenolic-aldehyde resins and amino-aldehyde resins in aqueous alkaline colloidal solution containing therein a finely divided, ligno-cellulosic extender and a minor amount of an alkali-solubilized, extracted lignin in oxidized condition and containing at least 1 to 7 mols of added oxygen per mol of lignin.

6. Plywood-, and laminating-adhesive solutions which comprise a thermosetting aldehydic resin glue selected from the group consisting of phenolic-aldehyde resins and amino-aldehyde resins in aqueous colloidal solution containing therein a vegetable shell flour extender, free alkali and a minor amount of a substantially purified, extracted lignin dissolved therein by the action of the alkali present, said lignin being in oxidized condition and containing at least 1 to 7 mols of added oxygen per mol of lignin.

7. Plywood-, and laminating-adhesive solutions which comprise a thermosetting aldehydic resin glue selected from the group consisting of phenolic-aldehyde resins and amino-aldehyde resins in aqueous alkaline, colloidal solution containing therein a finely divided, ligno-cellulose extender and an addition of a minor amount of the sodium salt of an extracted lignin, the lignin being in oxidized condition and containing about 1 to 7 mols of added oxygen per mol of lignin.

8. Plywood bonded by an adhesive composition comprising a thermosetting aldehyde resin glue selected from the group consisting of phenolic-aldehyde resins and amino-aldehyde resins containing therein a finely divided, ligno-cellulosic extender and 5–50% of an extracted lignin in oxidized condition and containing about 1 to 7 mols of added oxygen per mol of lignin, in relation to the weight of the extender.

9. Plywood-, and laminating-adhesive compositions which comprise a phenolic-aldehyde resin glue in aqueous alkaline, colloidal solution containing therein a finely divided, ligno-cellulosic extender and a minor amount of an alkali-solubilized, extracted lignin in oxidized condition and containing about 1 to 7 mols of added oxygen per mol of lignin.

10. Plywood-, and laminating-adhesive solutions which comprise an alkaline phenolic-aldehyde resin emulsion containing therein a finely divided, ligno-cellulosic extender and alkali-dissolved, extracted lignin in oxidized condition and containing about 1 to 7 mols of added oxygen per mol of lignin, in a proportion of 15–20% in relation to the weight of the extender, and the ratio of the emulsion of 40–50% solid resin content to the extender-oxidized lignin components to the water being within the range of 5/1–4/1.75–7.

11. Plywood, and laminating-adhesive solutions which comprise a thermosetting aldehydic resin glue selected from the group consisting of phenolic-aldehyde resins and amino-aldehyde resins in aqueous alkaline, colloidal solution containing therein nut shell flour and a minor amount of a substantially purified, extracted lignin dissolved in the solution, said lignin being in oxidized condition and containing about 1 to 7 mols of added oxygen per mol of lignin, said extracted lignin being derived from a kraft paper pulping process.

12. A process for improving the quality of plywood-, and laminating-adhesive solutions containing a thermosetting aldehydic resin glue selected from the group consisting of phenolic-aldehyde resins and amino-aldehyde resins in aqueous alkaline colloidal solution which comprises adding thereto a homogeneous mixture of a finely divided, ligno-cellulosic extender and a minor amount of extracted lignin in oxidized condition and containing about 1 to 7 mols of added oxygen per mol of lignin and dissolving the oxidized lignin in said aqueous alkaline solution.

13. A process for improving the quality of plywood-, and laminating-adhesive compositions which comprises adding to a thermosetting aldehydic resin glue selected from the group consisting of phenolic-aldehyde resins and amino-aldehyde resins in aqueous alkaline colloidal solution a homogeneous mixture of a vegetable shell flour and a minor amount of an alkali-solubilized lignin extracted by a kraft paper pulping process, said lignin being in oxidized condition and containing about 1 to 7 mols of added oxygen per mol of lignin.

14. A composition of matter for adding to and improving the working and bonding qualities of an alkaline synthetic resin adhesive solution for plywood and other laminate production, consisting essentially of a homogeneous dry powdery mixture of a major proportion of a vegetable shell flour extender preponderantly of particle sizes below about 100 mesh, the particles of which are coated with an epoxy resin derived by the reaction of a polyhydroxy hydrocarbon with a compound selected from the group consisting of epichlorohydrin and dichlorohydrin, and containing free epoxy groups, and a minor proportion, sufficient to enhance the viscosity of said solution, of a finely divided, extracted lignin, said lignin being in oxidized condition and containing about 1 to 7 mols of added oxygen per mol of lignin.

15. Plywood-, and laminating-adhesive solutions which comprise a phenolic-aldehyde resin glue in aqueous alkaline colloidal solutions containing therein a lesser amount of an epoxy resin derived by the reaction of a polyhydroxy hydrocarbon with a compound selected from the group consisting of epichlorohydrin and dichlorohydrin, and having free epoxide groups, a finely divided, ligno-cellulosic extender and an addition of a minor amount of an extracted lignin dissolved in the alkaline solution, said lignin being in oxidized condition and containing about 1 to 7 mols of added oxygen per mol of lignin.

16. Plywood-, and laminating-adhesive solutions which comprise a phenolic-aldehyde resin glue aqueous colloidal solution containing therein a finely divided, ligno-cellulosic extender and a minor amount of an extracted lignin in oxidized condition and containing about 1 to 7 mols of added oxygen per mol of lignin, and caustic alkali in an amount not more than about 20% of the extender-oxidized lignin content present in the composition.

17. A composition of matter for adding to and improving the working and bonding qualities of a liquid synthetic resin adhesive composition for plywood and laminate production, comprising a homogeneous dry powdery mixture of a major proportion of a finely divided, ligno-cellulosic extender preponderant of particle sizes below about 100 mesh and minor proportions, sufficient to enhance the viscosity of said adhesive composition, of both an extracted lignin and an extracted lignin in oxidized condition containing about 1 to 7 mols of added oxygen per mol of lignin.

18. A composition of matter for adding to and improving the working and bonding qualities of a liquid synthetic resin adhesive composition for plywood and laminate production, comprising a homogeneous dry powdery mixture of a major proportion of a finely divided ligno-cellulosic furfural by-product residue remaining after the extraction by acid hydrolysis of pentosans from a pentosan-containing vegetable material from plants of the family Graminales and a minor proportion, sufficient to enhance the viscosity of said adhesive composition, of an extracted lignin in oxidized condition and containing about 1 to 7 mols of added oxygen per mol of lignin, the particles of said mixture being preponderantly of sizes below 100 mesh.

19. A composition of matter for adding to and improving the working and bonding qualities of a liquid synthetic resin adhesive composition for plywood and laminate production comprising, a homogeneous dry powdery mixture of a major proportion of a non-fibrous bark phloem flour extender and a minor proportion, sufficient to enhance the viscosity of said adhesive composition, of extracted lignin in oxidized condition and containing about 1 to 7 mols of added oxygen per mol of lignin, the particles of said mixture being preponderantly of sizes below 100 mesh.

20. A composition of matter for adding to and improving the working and bonding qualities of a liquid synthetic resin adhesive composition for plywood and laminate production, comprising a homogeneous dry powdery mixture of a finely divided, non-fibrous ligno-cellulosic extender preponderantly of particle sizes below about 100 mesh and an oxidized, extracted lignin containing about 1 to 7 mols of added oxygen per mol of lignin, said mixture containing, by weight, from about 15 to 20 parts of said oxidized extracted lignin per about 80 to 85 parts of said extender.

21. A composition of matter for adding to and improving the working and bonding qualities of a liquid synthetic resin adhesive composition for plywood and laminate production, comprising a homogeneous dry powdery mixture of a major proportion of a finely divided, non-fibrous ligno-cellulosic extender preponderantly of particle sizes below about 100 mesh and a minor proportion of an oxidized, extracted lignin containing about 1 to 7 mols of added oxygen per mol of lignin, said oxidized extracted lignin showing a Brookfield No. 4 viscosity in the range of from 5,000 to over 90,000 centipoises by test of the suspension obtained by stirring a 60 gram sample of said oxidized extracted lignin for 8 minutes with 300 grams of distilled water in a 600 cc. beaker, adjusting the temperature of the resulting suspension to 77° F. and letting the suspension stand at 77° F. for 15 minutes.

22. Plywood-, and laminating-adhesive solutions which comprise a thermosetting aldehydic resin glue selected from the group consisting of phenolic-aldehyde resins and amino-aldehyde resins in aqueous alkaline, colloidal solution containing therein a finely divided, ligno-cellulose extender and minor amounts of both an extracted lignin and an oxidized, extracted lignin containing about 1 to 7 mols of added oxygen per mol of lignin.

23. A composition of matter for adding to and improving the working and bonding qualities of a liquid synthetic resin adhesive composition for plywood and laminated production, comprising a homogeneous dry powdery mixture of a major proportion of a finely divided non-fibrous ligno-cellulosic extender preponderantly of particle sizes below about 100 mesh and minor proportions, sufficient to enhance the viscosity of said adhesive composition, of both sodium lignate and an oxidized, extracted lignin containing about 1 to 7 mols of oxygen per mol of lignin, said oxidized extracted lignin showing a viscosity in the range of from 5,000 to over 90,000 centipoises by test of the suspension obtained by stirring a 60 gram sample of said oxidized extracted lignin for 8 minutes with 300 grams of distilled water in a 600 cc. beaker, adjusting the temperature of the resulting suspension to 77° F. and letting the suspension stand at 77° F. for 15 minutes.

24. Plywood-, and laminating-adhesive solutions which comprise a thermosetting aldehydic resin glue selected from the group consisting of phenolic-aldehyde resins and amino aldehyde resins in aqueous alkaline, colloidal solution containing therein a finely divided ligno-cellulose extender and minor amounts of both sodium lignate and an oxidized, extracted lignin containing about 1 to 7 mols of added oxygen per mol of lignin.

References Cited in the file of this patent
UNITED STATES PATENTS

| | | |
|---|---|---|
| 2,161,748 | Samaras et al. | June 6, 1939 |
| 2,430,736 | Redfern | Nov. 11, 1947 |
| 2,506,486 | Bender et al. | May 2, 1950 |
| 2,669,522 | Othmer et al. | Feb. 16, 1954 |
| 2,878,197 | Baxter et al. | Mar. 17, 1959 |

UNITED STATES PATENT OFFICE

CERTIFICATE OF CORRECTION

Patent No. 3,093,604　　　　　　　　　　　　June 11, 1963

Joseph W. Ayers

It is hereby certified that error appears in the above numbered patent requiring correction and that the said Letters Patent should read as corrected below.

Column 1, line 27, for "of" read -- or --; column 3, line 58, for "oxidizing" read -- oxidized --; column 9, line 6, for "90°" read -- 90% --; lines 8 and 36, for "extended" read -- extender --; same column 9, line 72, for "proponderantly" read -- preponderantly --; column 12, line 8, for "preponderant" read -- preponderantly --; column 13, lines 1 and 2, for "laminated" read -- laminate --.

Signed and sealed this 7th day of January 1964.

(SEAL)
Attest:

ERNEST W. SWIDER

Attesting Officer

EDWIN L. REYNOLDS

Acting　Commissioner of Patents